June 5, 1934. K. MOERS 1,961,701
GASEOUS ELECTRIC ARC DISCHARGE LAMP
Filed Dec. 14, 1933
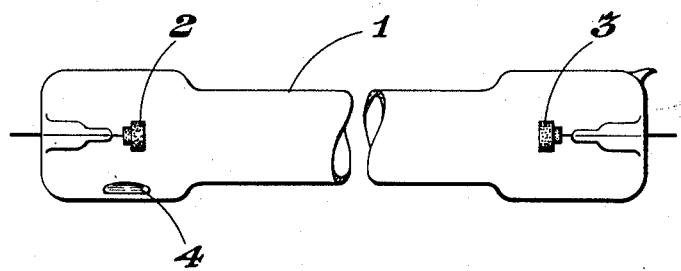
INVENTOR
Kurt Moers
BY Harry E. Dunham
ATTORNEY Patented June 5, 1934

1,961,701

UNITED STATES PATENT OFFICE 1,961,701

GASEOUS ELECTRIC ARC DISCHARGE LAMP

Kurt Moers, Berlin-Steglitz, Germany, assignor to General Electric Company, a corporation of New York Application December 14, 1933, Serial No. 702,396
In Germany December 27, 1932

5 Claims. (Cl. 176—122)

The present invention relates to gaseous electric arc discharge lamps generally and more particularly the invention relates to improvements in such lamps having carbon electrodes.

Carbon arc lamps having a vaporizable material therein, such as mercury, and which are evacuated or filled with an inert gas, such as nitrogen or a rare gas, emit light having a wide spectrum range useful for many purposes including photography and therapeutic work. As compared to carbon arc lamps having no mercury therein the above described arc lamp is of greater luminous efficiency and sputtering of the electrodes is substantially reduced. While carbon arc lamps of this type are useful in many fields their use has not become general because the containers thereof become coated with light absorbing deposits of electrode material after the lamp has been operating a comparatively short time which lowers the efficiency and shortens the useful life of the lamp. Degassing the electrodes does not solve the problem.

The object of the present invention is to provide an arc lamp comprising a sealed container, carbon electrodes, sealed therein and a gaseous atmosphere therein comprising mercury vapor wherein light absorbing deposits of electrode material on the container of the lamp are avoided. Still further objects and advantages attaching to the device and to its use and operation will be apparent to those skilled in the art from the following particular description.

I have discovered that light absorbing deposits of electrode material on the container of a carbon arc lamp of the above type are avoided when the gaseous atmosphere comprises pure oxygen or an oxygen containing gas free from nitrogen, such as pure carbon dioxide or pure carbon monoxide or a mixture of such gases. The containers of such arc lamps have no undesired coating thereon even after 1,000 hours of operation and sputtering of the electrodes is completely avoided. My explanation of this phenomena, though it will be understood of course, that I do not desire to be bound by or limited to this explanation, is that a cyclic process takes place between the carbon electrodes and the gaseous atmosphere which quickly reaches a state of dynamic equilibrium of reversible reactions. The presence of the heavy mercury atoms in the gaseous atmosphere is undoubtedly favorable to this state of dynamic equilibrium.

In the drawing accompanying and forming part of this specification an embodiment of the invention is shown in a side elevational view, but as such illustration is primarily for purposes of disclosure it will be understood of course that numerous changes in the form and details of the device and in its use and operation may be made by those skilled in the art without departure from the broad spirit and scope of the invention.

Referring to the drawing the new and novel arc lamp comprises a container 1 having carbon electrodes 2 and 3 sealed therein, one at each end thereof. A principal gas comprising oxygen bearing gases free from nitrogen, such as carbon dioxide or carbon monoxide or a mixture of such gases, is sealed into said container 1 as well as a quantity of mercury 4. I have discovered that when the carbon electrodes are treated by heating them to a temperature of about 2,200° C. in an atmosphere of carbon tetrachloride and then graphiting them at a temperature of about 3,000° C. in a hydrogen atmosphere poisoning of the gaseous atmosphere by gases given off from the electrodes and decomposition of said electrodes is completely avoided during the operation of the lamp.

The pressure of the principal gas in the container 1 depends upon the length of the arc desired. When the arc is 10 cm. or more in length I prefer a gas pressure of 5 to 50 mm. at room temperature.

The new and novel arm lamp is concentrated source of high intensity light useful in beacon work, or the like, and the spectrum of the light closely approaches that of daylight since it comprises a line spectrum superimposed upon an almost continuous spectrum. The light emitted by the lamp is rich in ultra-violet rays and other rays having actinic qualities of value in therapeutic or photographic work. The light from the lamp is very steady in spite of the comparatively long length of the arc.

The arc can be constricted still further to make the lamp a still more concentrated light source of higher intensity when the principal gas comprises 50% of hydrogen. Gases in which hydrogen is a component, such as a gas made up of hydrogen and carbon, or hydrogen and oxygen, or of hydrogen, carbon and oxygen can be used in place of the hydrogen when desired.

It will be understood, of course, that the shape of the container and the arrangement of the electrodes can be changed when desired and the starting and operating apparatus of the new and novel carbon arc lamp is the same as that used for open carbon arc lamps or similar lamps having sealed containers well known in the art heretofore.

What I claim as new and desire to secure by Letters Patent of the United States is:—

1. An arc lamp comprising a container, carbon electrodes sealed therein, a gaseous atmosphere therein comprising mercury vapor and a gas reactive with the carbon of said electrodes.

2. An arc lamp comprising a container, carbon electrodes sealed therein, a gaseous atmosphere therein comprising mercury vapor and oxygen.

3. An arc lamp comprising a container, carbon electrodes sealed therein, a gaseous atmosphere therein comprising mercury vapor and an oxygen containing gas free from nitrogen.

4. An arc lamp comprising a container, carbon electrodes sealed therein, a gaseous atmosphere therein comprising mercury vapor, hydrogen and an oxygen containing gas free from nitrogen.

5. The method of purifying carbon electrodes which consists in heating said electrodes to a temperature of 2,200° C. in an atmosphere of carbon tetrachloride and then graphiting said electrodes at a temperature of 3,000° C. in an atmosphere of hydrogen.

KURT MOERS.